United States Patent

Nelson

[15] 3,667,054

[45] May 30, 1972

[54] PULSE TRAIN DECODER WITH PULSE WIDTH REJECTION

[72] Inventor: George P. Nelson, Oxon Hill, Md.

[73] Assignee: The United States of America as represented by the Secretary of the Navy

[22] Filed: Feb. 10, 1971

[21] Appl. No.: 114,276

[52] U.S. Cl. ..........................328/111, 307/221 R, 307/234, 328/119, 343/6.5 LC

[51] Int. Cl. ..........................H03k 5/20

[58] Field of Search ..........................307/221, 234, 265; 328/37, 328/111-112, 119; 343/6.5 R, 6.5 LC, 6.8 R, 6.8 LC

[56] References Cited

UNITED STATES PATENTS

| | | | |
|---|---|---|---|
| 3,423,728 | 1/1969 | Wissel | 328/119 X |
| 3,551,823 | 12/1970 | Stevens | 328/119 |
| 2,948,854 | 8/1960 | Bess | 328/119 X |
| 3,051,928 | 8/1962 | Sullivan | 328/119 X |
| 3,395,353 | 7/1968 | King | 328/111 X |

OTHER PUBLICATIONS

" Distortion Error Detector" by Oeters, IBM Tech Disclosure Bulletin, Vol. 4, No. 2, July 1961, page 38

*Primary Examiner*—Stanley D. Miller, Jr.

*Attorney*—R. S. Sciascia, Arthur L. Branning and Sol Sheinbein

[57] ABSTRACT

Logic circuitry to decode a series of pulses in an IFF system. Decoding is accomplished by sensing the presence of multiple pulses in a distinct time relationship with each other and excluding those pulse trains in which the individual pulses do not have the correct time relationship. The width of the individual pulses is also used as a decoding criteria and if a particular pulse does not have the correct width by being either too narrow or too wide, it is not considered for time position decoding.

3 Claims, 1 Drawing Figure

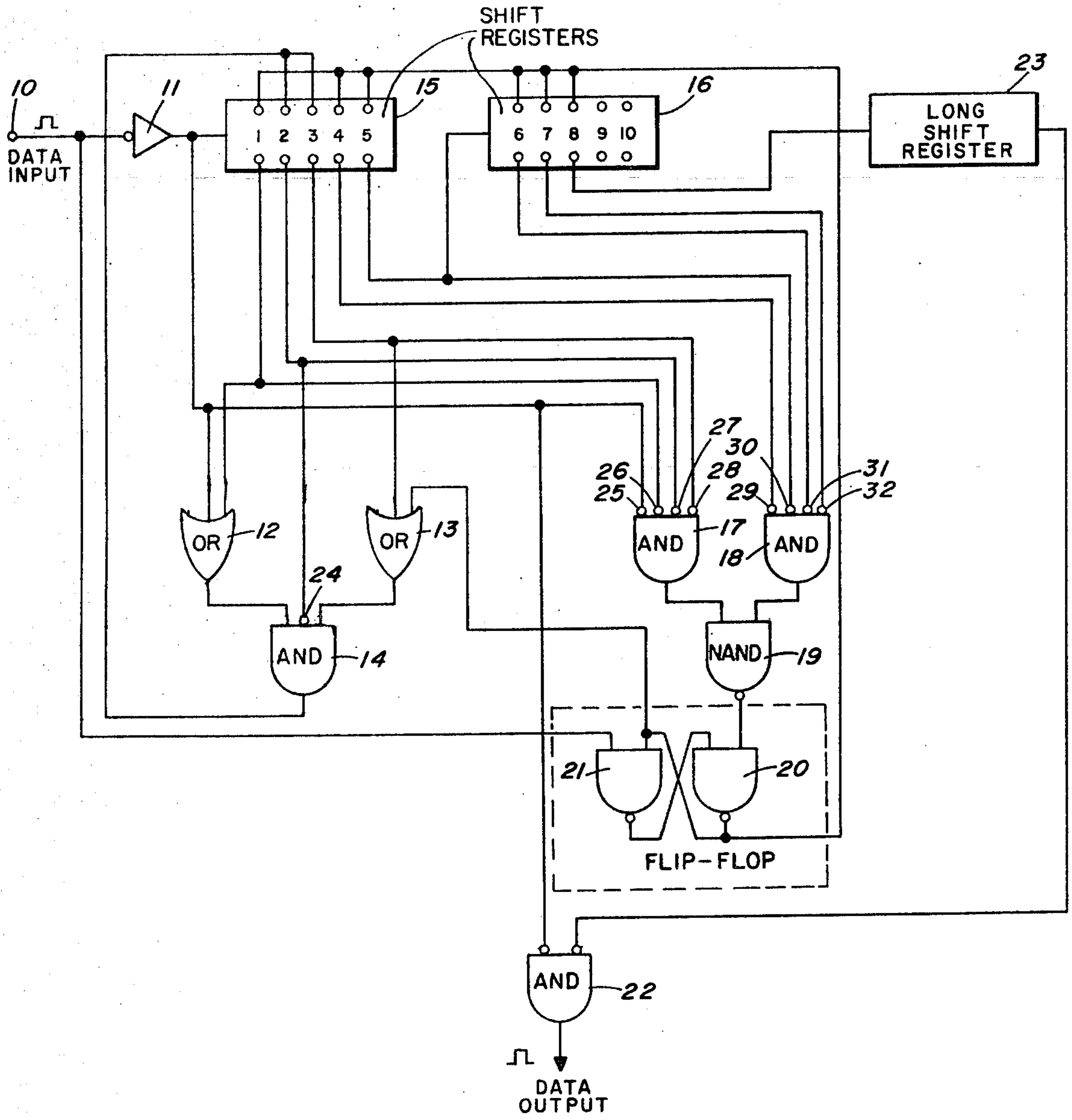
INVENTOR.
GEORGE P. NELSON
BY
Sol Sheinbein AGENT
Arthur L. Lessing ATTORNEY

PULSE TRAIN DECODER WITH PULSE WIDTH REJECTION

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

Pulse trains normally have been decoded using delay lines of some type. For decoding the pulse trains found in IFF (Identification Friend or Foe) systems, the delay lines have normally consisted of multiple series connected inductor-capacitor networks, simulating a long length of coaxial cable. Taps are placed at various points along these delay lines corresponding to the expected time relationships of the pulses on the incoming pulse trains. Decoding of the pulse train is accomplished by determining the simultaneous presence, or coincidence, of pulses at all the expected time positions on the delay line. Incorrect timing or the absence of an expected pulse will result in no decode being made.

The decoding criteria involving the correct width of the individual incoming pulses is normally performed prior to any attempt at time position decoding. Although rejection of narrow pulses can be performed simultaneously with, and using the same delay line as the pulse position decoding, wide pulse rejection requires either the addition of a second delay line to the time position delay line, or increasing the pulse processing time by that of the greatest acceptable input pulse width. The reason is that in a coaxial delay line, including discrete component simulations, once information has been inserted within the delay line, it cannot be removed by any known technique. Grounding the delay line or open circuiting the delay line at any point along its length results in the pulse being reflected back to the input rather than being eliminated. Because of the reflection, the delay line would then contain invalid data which could result in false decoding. The only solution is to separate the delay line into two distinct portions, redriving the second portion when necessary.

Another solution to properly rejecting wide pulses is to increase the signal processing time by that of the widest decodable, or acceptable, input pulse. Then, in addition to proper time position decoding, each tap along the delay line would also have to make a pulse width check for data acceptability, allowing an amount of time equal to that of the widest acceptable pulse, before time position decoding.

All of the above assumes that all input pulses, with the exception of the last one received, will be checked for proper width. If all pulses, including the last one received, are to be checked, processing time must be increased by a minimum amount of the widest acceptable pulse.

SUMMARY OF THE INVENTION

The present invention has overcome the disadvantages of prior decoders by replacing the coaxial or simulated coaxial delay line previously used by multiple bistable flip-flop circuits connected in series, forming a long shift register. The application of clock pulses to all of the flip-flop circuits at the same time controls the transmission of data through the shift register. Each clock pulse moves the data one stage of the shift register, each stage being a separate flip-flop. If the time between clock pulses is small compared to the expected input pulse width and the number of shift register stages sufficiently large, the shift register will closely approximate normal delay line performance. The maximum possible error between the input to the long register and at the output of the same register will be equal to one clock period. Placement of taps at various points along the shift register, a tap being possible at each discrete flip-flop, results in time position decoding of multiple pulses being possible, just as in a normal delay line. Data is then removed from the shift register to check for proper pulse width within the shift register on appropriate logic circuitry. If a particular pulse has been found to be of unacceptable width, it may be removed from the shift register before being considered for time position decoding.

OBJECTS OF THE INVENTION

It is therefore an object of the present invention to provide an improved IFF digital decoder.

Another object of the present invention is to provide a decoder capable of detecting wide and narrow pulses and rejecting them.

A still further object of the present invention is to provide a decoder having true wide and narrow pulse rejection without the addition of processing time besides that normally required for time position decoding.

Yet another object of the present invention is to provide a decoder having wide and narrow pulse rejection on a real time basis.

Yet another object of the present invention is to provide a decoder capable of removing unwanted signals prior to supplying a data output.

A still further object of the present invention is to provide a decoder capable of checking for proper pulse width simultaneously with normal time position decoding.

DESCRIPTION OF THE DRAWING

Other objects and many attendant advantages of this invention will be readily appreciated as the same becomes better understood by reference to the following detailed description when considered in connection with the accompanying drawing wherein:

The FIGURE is a block diagram illustrating the various components of the circuitry.

DESCRIPTION OF THE PREFERRED EMBODIMENT

The FIGURE shows how simultaneous pulse width rejection and time position decoding may be accomplished. The pulse train to be decoded by this circuit consists of two pulses, although trains of multiple pulses could be decoded with the addition of taps to the long shift register at appropriate points. Gate 11 is an inverter which changes the polarity of the positive input data to negative. The input data is then transferred into shift register 15. The total shift register for time position decoding consists of the long shift register 23 plus shift registers 15 and 16. The total time delay, $T$, through the total shift register is, $$T = N/f$$

where $N$ is the number of stages in the shift register, and $f$ is the clock frequency shifting the data through the shift registers.

Time position decoding of a two pulse train, assuming the input pulse spacing is equal to $T$, is by sensing the simultaneous presence of the second input pulse at the beginning of the shift register (input to shift register 15) and the delayed first input pulse at the output of the long shift register 23 with AND gate 22. The output of AND gate 22 is a single positive pulse, the decode pulse of the two pulse train.

The input data being shifted through the shift registers 15, 16 and 23 is checked for the presence of both wide and narrow pulses. The presence of pulses which are excessively narrow for proper decoding is detected by OR gates 12, 13 and AND gate 14. The presence of pulses which are too wide for proper decoding is detected by AND gates 17 and 18.

Narrow pulse rejection is accomplished in the following manner. AND gate 14 is the narrow pulse detector, producing a logic 1 only when its three inputs are a logic 1. Bit output 2 from shift register 15 is logic 0 when there is data in the shift register at bit 2. This logical 0 is inverted to a logical 1 by inverter 24. Logic 0 from gate 12 indicates the absence of data at either the shift register 15 input or its first bit output. The third input to AND gate 14 is from gate 13 and is logic 1 if bit output 3 from shift register 15 is logic 1. AND gate 14 produces a logic 1 only when data present is completely contained between the input of the shift register and bit 2. When data wider than this is present, AND gate 14 produces a logic 0. Therefore, a logic 1 at the gate 14 output signifies the presence of a narrow pulse within the register. The logic 1 output is fed to the bit preset connections for bits 2 and 3 in shift register 15 to return the flip-flops of bits 2 and 3 to a logic 1, thus removing the data that had been in those bits.

AND gates 17 and 18 comprise the wide pulse detector circuit. The outputs of these two gates are logic 1 only when all the inputs to the individual inverters 25–32 are logic 0, i.e., data present at the shift register input and shift register stages 1 through 7. NAND gate 19 is logic 0 only when both inputs of the gate from AND gates 17 and 18 are logic 1. Therefore, NAND gate 19 is logic 0 only when the data pulse is present within the register without interruption over the entire length of the register encompassed by AND gates 17 and 18.

The output of NAND gate 19 is a logic 0 only when a wide pulse has been detected and it sets a RS type flip-flop composed of NAND gates 20 and 21. The output of NAND gate 20 is a logic 1 which sets shift register bits 1, 4, 5, 6, 7 and 8 to a logic output 1, eliminating the data that was contained within those stages. The output of NAND gate 20 is also fed to OR gate 13, enabling AND gate 14 to recognize the data contained in shift register stages 2 and 3 as a narrow pulse, which is then eliminated in the manner previously described.

The RS flip-flop of NAND gates 20 and 21 remains set, logic 1 from NAND gate 20 preventing transfer of any data at the shift register input, until reset. The flip-flop is reset when a logic 0 at the input to inverter 11 is detected, thus signifying the end of the wide pulse, this signal being the other input to NAND gate 21. After the RS flip-flop has been reset, the shift register will once again accept data in the normal manner.

It will be recognized that many modifications and variations of the present invention are possible in light of the above teachings. Alternate methods of construction would depend upon the types of logic available. The main shift register could be made to function with positive data pulses in the register instead of the stated negative data pulses. This would merely require a change in the type of gating to accomplish the pulse width rejection. The data elimination from the shift register would then be from the clear or reset terminals of the individual flip-flops in the shift register instead of the set or preset terminals.

It is therefore to be understood that within the scope of the appended claims the invention may be practiced otherwise than as specifically described.

What is claimed and desired to be secured by Letters Patent of the United States is:

1. A decoder including the logic circuitry for detecting and rejecting narrow and wide pulses while time position decoding is being accomplished comprising:

a shift register having a plurality of stages for shifting input data;

a first logic circuit coupled to said shift register for detecting a pulse whose width is wider than a first specified value;

a second logic circuit coupled to said shift register for detecting a pulse whose width is more narrow than a second specified value;

means coupled to said logic circuits and said shift register for eliminating a pulse whose width is wider than the first specified value and more narrow than said second specified value;

a first coincidence means coupled to said shift register for providing an output pulse when pulses of said input data are of a particular spacing so long as said pulses of said input data each fall within said first and second specified value.

2. A decoder as recited in claim 1 wherein said narrow pulse detection comprises:

a first OR gate having one of its inputs from a first stage of said shift register and a second input coupled to the data input to said shift register;

a second OR gate having an input from a third stage of said shift register;

second coincidence means coupled to said first and second OR gates and to a second stage of said shift register;

whereby said second coincidence means produces an output pulse only when there is data located in said second stage of said shift register, said output pulse resetting said second and third stages of said shift register.

3. A decoder as recited in claim 4 wherein said second logic circuit comprises:

a third coincidence means coupled to at least seven stages of said shift register;

said third coincidence means output signal indicating a pulse wider than said second specified value within said shift register.

* * * * *